(12) United States Patent
Schroeder et al.

(10) Patent No.: US 8,503,148 B2
(45) Date of Patent: Aug. 6, 2013

(54) CIRCUIT BREAKER WITH FAULT INDICATION AND SECONDARY POWER SUPPLY

(75) Inventors: Jeremy D. Schroeder, North Liberty, IA (US); Joseph Beierschmitt, Marion, IA (US); Randall Gass, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 288 days.

(21) Appl. No.: 12/908,312

(22) Filed: Oct. 20, 2010

(65) Prior Publication Data

US 2012/0099237 A1  Apr. 26, 2012

(51) Int. Cl.
  *H01H 73/00* (2006.01)
(52) U.S. Cl.
  USPC .......................................... 361/115
(58) Field of Classification Search
  USPC .......................................... 361/115
  See application file for complete search history.

(56) References Cited

U.S. PATENT DOCUMENTS

| | | | |
|---|---|---|---|
| 4,335,413 A | 6/1982 | Engel et al. | |
| 4,801,906 A | 1/1989 | Morris et al. | |
| 4,969,063 A | 11/1990 | Scott et al. | |
| 5,220,479 A * | 6/1993 | Fraisse | 361/97 |
| 5,343,192 A | 8/1994 | Yenisey | |
| 5,546,266 A | 8/1996 | Mackenzie et al. | |
| 5,847,913 A | 12/1998 | Turner et al. | |
| 7,151,656 B2 | 12/2006 | Dvorak et al. | |
| 7,558,038 B2 | 7/2009 | Wiese et al. | |
| 2010/0123981 A1 | 5/2010 | Erger et al. | |
| 2010/0149711 A1 * | 6/2010 | Larson et al. | 361/93.1 |
| 2011/0147178 A1 * | 6/2011 | Larson | 200/308 |

FOREIGN PATENT DOCUMENTS

| | | |
|---|---|---|
| DE | 102005047042 | 4/2007 |
| EP | 1589628 | 10/2005 |
| GB | 2290180 | 12/1995 |

OTHER PUBLICATIONS

International Search Report mailed Feb. 13, 2012 which issued in corresponding International Patent Application No. PCT/US2011/056363 (5 pages).
Written Opinion mailed Feb. 13, 2012 which issued in corresponding International Patent Application No. PCT/US2011/056363 (5 pages).

* cited by examiner

*Primary Examiner* — Scott Bauer
(74) *Attorney, Agent, or Firm* — Nixon Peabody LLP

(57) ABSTRACT

An electronic circuit breaker includes controllable contacts adapted to connect a power source to at least one load, and a microcontroller for monitoring the flow of power to the load, detecting different types of fault conditions and automatically opening the contacts in response to a fault. A primary power supply of the breaker receives power from the line source when the contacts are closed, and supplies power to the control circuitry. Fault indicators in the microcontroller indicate the type of fault that caused the contacts to open. A secondary power supply provides power to the control circuitry when the contacts are open and a switch is closed.

14 Claims, 2 Drawing Sheets

CIRCUIT BREAKER WITH FAULT INDICATION AND SECONDARY POWER SUPPLY

FIELD OF THE INVENTION

This invention relates to electronic circuit breakers and particularly to an improved circuit breaker having fault indication and a secondary power supply for the fault indication while the circuit breaker is open.

BACKGROUND

Today's residential electronic circuit breakers (AFCI) monitor and protect against many different types of fault conditions. When a circuit breaker trips, it is advantageous to know what type of fault the circuit breaker interrupted in order to accurately and rapidly correct the fault condition. The electronic modules in such circuit breakers are capable of indicating the interrupted fault only when the electronics are powered. Normally this requires re-closing the circuit breaker to power the electronic module. However, re-closing the circuit breaker to indicate the cause of the interrupted fault also means re-energizing the fault if the fault is still present. In order to safely re-close the circuit breaker, an electrician must open the load center and remove the line load and neutral load wires from the circuit breaker. It would be desirable to have a secondary means of powering the electronic module to allow the electronic module to indicate the interrupted fault, without the need to re-energize the fault at levels that would be considered hazardous, thus eliminating the need to remove the load wires from the circuit breaker.

BRIEF SUMMARY

In accordance with one embodiment, an electronic circuit breaker includes controllable mechanical contacts adapted to connect an AC power source to at least one load, and control circuitry for monitoring the flow of power from the AC power source to the load, detecting different types of fault conditions and automatically opening the contacts in response to the detection of a fault condition. A primary power supply receives power from the AC power source when the contacts are closed, and supplying power to the control circuitry. Fault indicators controlled by the control circuitry indicate the type of fault condition causing the control circuitry to open the contacts, and a secondary power supply supplies power to the control circuitry when the contacts are open and a manually operated switch is closed. By supplying the control circuitry with power from a secondary supply while the breaker contacts are open, this breaker system avoids any need to close the circuit breaker onto a hazardous fault to determine the reason the circuit breaker tripped. It also avoids any need to remove branch circuit wiring from the circuit breaker, or to re-open the circuit breaker from a load center, to indicate the cause of a trip, to update firmware, or to perform diagnostics.

In one implementation, the manually operated switch is connected to the AC power source on the source side of the controllable mechanical contacts, and the other side of the switch is coupled to the control circuitry so that the closing of the switch couples the AC power source to the control circuitry for supplying power to the control circuitry when the contacts are open. A rectifier may be coupled to the manually operated switch and to the control circuitry for converting power from the AC power source to DC power for the control circuitry.

The control circuitry preferably includes a microcontroller adapted to receive power via the contacts when the contacts are closed or via the manually operated switch when the contacts are open. The microcontroller is programmed to detect fault conditions, to open the contacts in response to the detection of a fault condition, and to automatically switch between a fault-protection mode of operation when the contacts are closed, or a fault-indicating mode of operation when the contacts are open. The microcontroller may be programmed to detect the coupling of the AC power source to the microcontroller via the contacts, and to automatically switch to the fault-indicating mode when the AC power source is not coupled to the microcontroller via the contacts.

BRIEF DESCRIPTION OF THE DRAWINGS

The invention may best be understood by reference to the following description taken in conjunction with the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
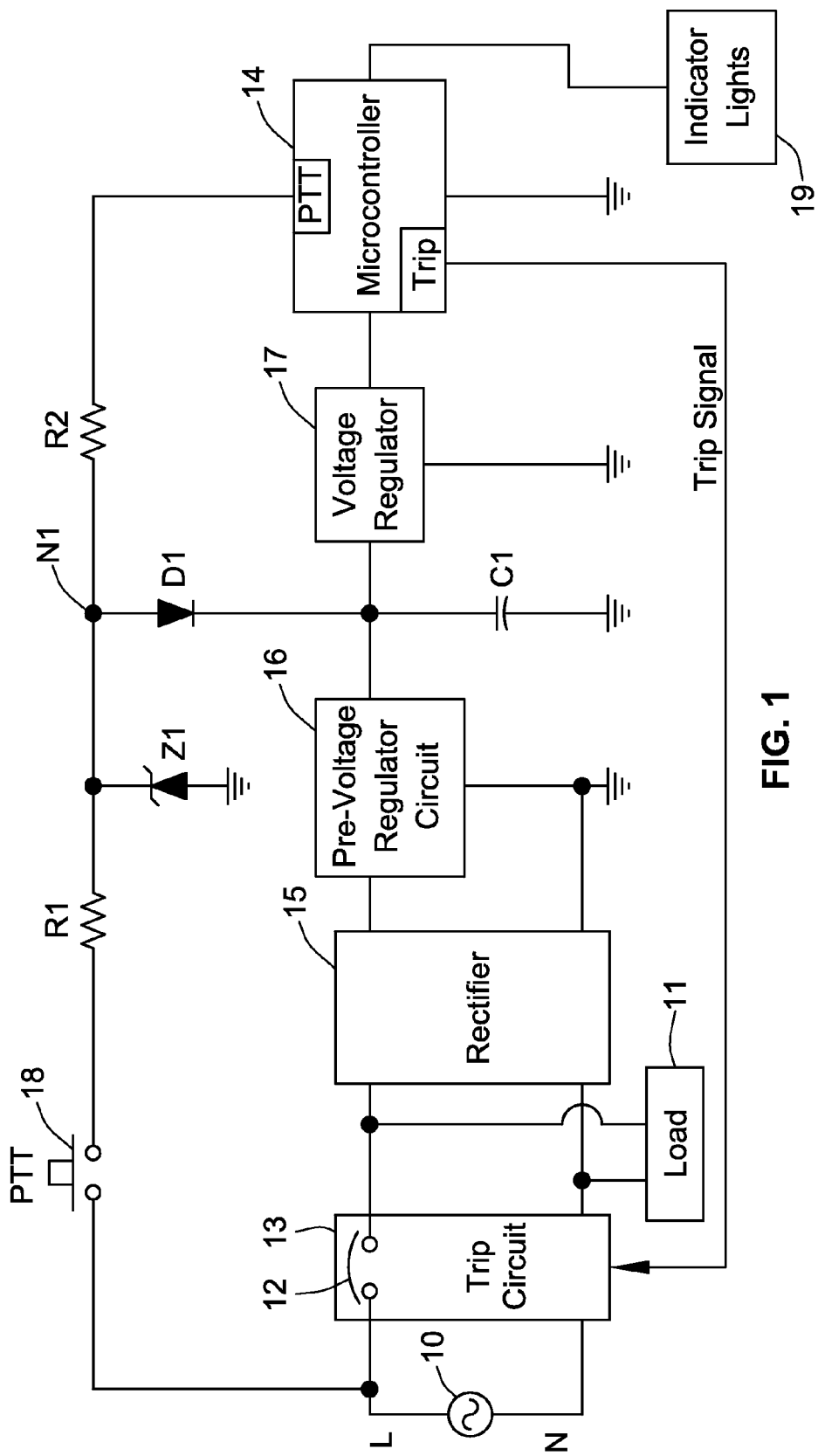
FIG. 1 is a schematic diagram of a portion of the electrical circuitry in a circuit breaker that is capable of indicating the type of fault that causes the circuit breaker to trip.

FIG. 1 illustrates a circuit breaker that monitors the electrical power supplied to one or more loads 11 from a line power source 10 such as a 120-volt AC power source. During normal operation, i.e., in the absence of a fault, the source 10 supplies AC power to the load 11 through controllable mechanical contacts, i.e., normally closed breaker contacts 12 in a trip circuit 13 which automatically opens to protect the load 11 as known in the art. In addition, DC power is supplied to a microcontroller 14 in the breaker from a primary power source that includes a full wave rectifier 15 (such as a diode bridge), a pre-voltage regulator circuit 16 and a voltage regulator 17. The diode bridge 15 rectifies AC power from the source 10 to produce a DC output supplied to the pre-voltage regulator circuit 16. The pre-voltage regulator circuit 16 in turn supplies power to the voltage regulator 17, which supplies the microcontroller 14 with a regulated DC input voltage. A push-to-test button 18 is connected to a PTT input of the microcontroller 14 to permit manually initiated testing of various parameters of the circuit breaker, as described, for example, in U.S. Pat. No. 7,151,656, which is assigned to the assignee of the present invention.

When a fault is detected by the circuit breaker, the microcontroller 14 generates a trip signal that is supplied to the trip circuit 13 to automatically opening the breaker contacts 12 to interrupt the flow of electrical current to the load. The microcontroller also stores information identifying the reason for the trip, such as the detection of a ground fault or an arcing fault. When the user desires to retrieve the stored information following a trip, it is necessary to supply power to the microcontroller 14 to enable the microcontroller to retrieve the stored information and to display or otherwise communicate that information to the user. If the AC power source 10 is re-connected to the rectifier 15 by re-closing the breaker contacts 12, there is a risk of re-energizing the fault that caused the trip. Thus, the microcontroller 14 is preferably powered without closing the breaker contacts 12, to avoid re-energizing the fault that caused the trip in the first place.

In the illustrative circuit, a secondary power supply can be coupled to the microcontroller 14, while the breaker contacts 12 are open, by pushing the push-to-test button 18 to couple the line side of the AC power source 10 to the input of the voltage regulator 17. From the PTT switch that is closed by pressing the PTT button 18, the AC signal from the source 10 passes through a current-limiting resistor R1 and then is clamped by a zener diode Z1. A half-wave rectifier formed by a diode D1 allows current to flow from the node N1 between the diode D1 and the resistor R1 to the input of the voltage regulator 17, and this current is sufficient to charge an input capacitor C1 and power the voltage regulator 17. The voltage regulator 17 then provides the microcontroller 14 with the necessary voltage and current to enable the microcontroller 14 to retrieve and display the type of fault that caused the trip. The same signal supplied to the diode D1 is also supplied to the PTT input of the microcontroller via resistor R2, so that the microcontroller 14 can detect when the PTT switch has been closed.

Thus, to check on what type of fault caused the circuit breaker to trip, a user simply pushes the PTT button 18 to temporarily couple the AC power source to the voltage regulator 17 via resistor R1 and diode D1. The regulator 17 supplies power from C1 to the microcontroller 14 so that information identifying the type of fault that caused the trip is retrieved by the microcontroller 14 and displayed to the user, e.g., by indicator lights 19 or any other desired type of indicator. The user continues to press the PTT button 18 until the displayed fault indication is understood, and then the user releases the PTT button 18 to power down the microcontroller 14.

Figure 2:
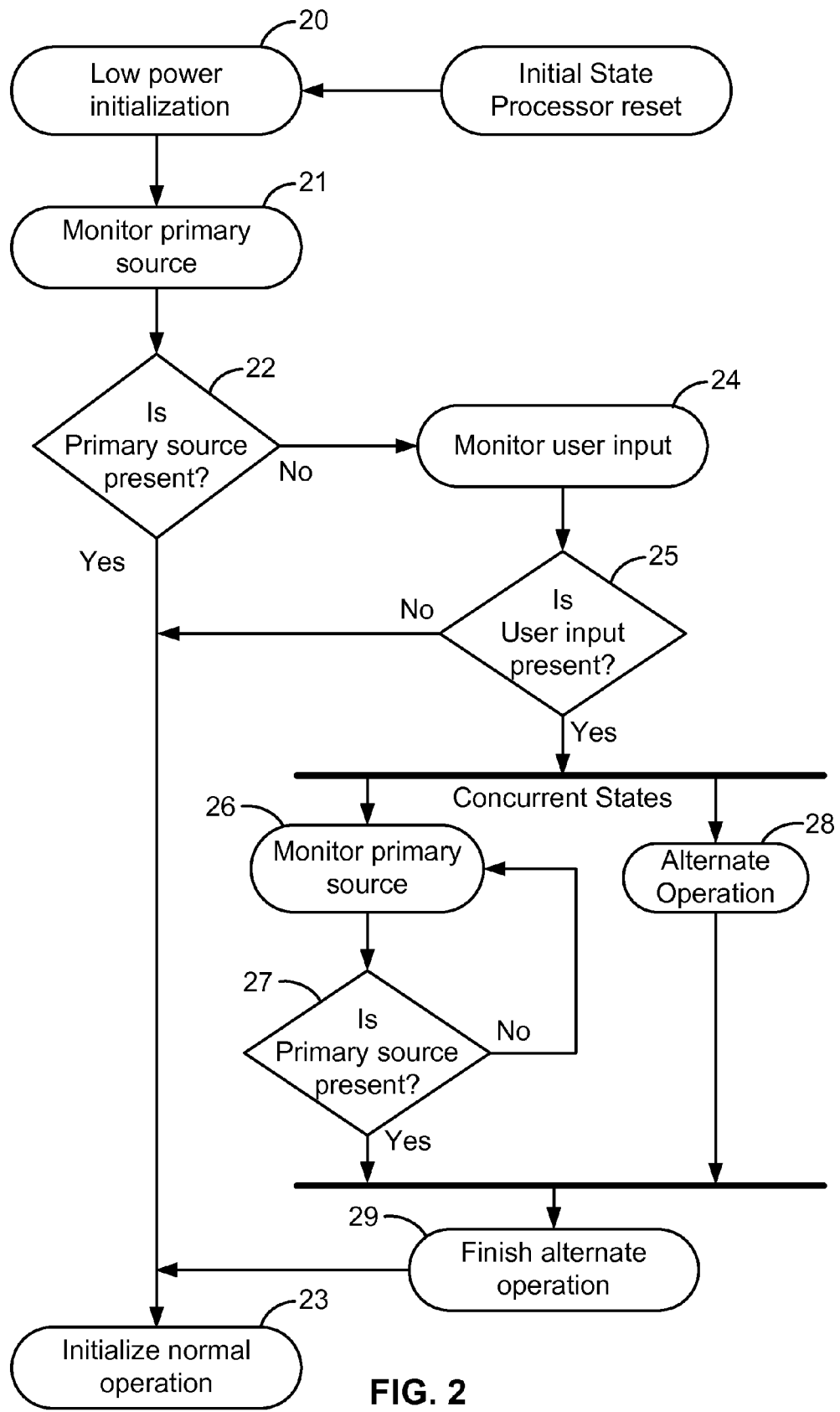
FIG. 2 is a flow diagram of a routine executed by the microcontroller in the circuitry of FIG. 1 for activating a secondary power supply for supplying power to the microcontroller and a fault indicator while the circuit breaker is tripped.

Referring to FIG. 2, upon being powered by either power source, the firmware initializes to a low-power state at step 20 until it determines which mode of operation it should enter. During this low-power state, the firmware monitors for the primary power supply (i.e., a standard voltage monitoring circuit) at step 21, and step 21 determines whether the primary power supply is present. If the answer is affirmative, the microcontroller proceeds to step 23 where the normal operating mode is initialized. If the answer at step 22 is negative, the system advances to step 24 to monitor for a user input (i.e., closing of the PTT switch), and step 25 determines whether the user input is present. If the answer at step 25 is negative, the system proceeds to step 23 where the normal operating mode is initialized. An affirmative answer at step 25 advances the system to a pair of concurrent states represented by steps 26 and 27 in one path and step 28 in a parallel path. Step 26 monitors for the primary power supply, and step 27 determines whether the primary power supply is present. If the answer at step 27 is negative, the system returns to step 26, and this loop continues as long as the primary power supply is not detected. Meanwhile, in the parallel path, step 28 initiates the alternate mode of operation, and the system then advances to step 29 to finish the alternate operation, which is to indicate the type of fault that caused a trip.

It can be seen from FIG. 2 that the firmware enters the alternate mode only when (1) no power from the primary power supply is detected and (2) a closed PTT switch is detected. The firmware enters, or remains in, the normal operating mode whenever power from the primary power supply is detected, regardless of whether the PTT switch is open or closed.

During the normal operating mode, in which the microcontroller 14 is supplied with power from the primary power supply (via the closed breaker contacts 12), the firmware in the microcontroller 14 records the cause of an electronic trip event in the module's internal memory, prior to issuing the trip signal that causes the breaker contacts to open. During the alternate mode of operation, in which the microcontroller 14 is supplied with power from the secondary power supply, the firmware recalls a record of trip events from the memory and displays that information to the user. While in the alternate mode, the firmware continuously monitors for the primary power supply, and switches back to the normal operating mode when power from the primary power supply is detected. With the addition of a communication/storage port, the alternate mode of operation can also perform a self-update feature and/or circuit diagnostics.

By supplying the microcontroller 14 with power from a secondary supply while the breaker contacts 12 are open, the system described above avoids any need to close the circuit breaker onto a hazardous fault to determine the reason the circuit breaker tripped. It also avoids any need to remove branch circuit wiring from the circuit breaker, or to re-open the circuit breaker from a load center, to indicate the cause of a trip, to update firmware, or to perform diagnostics.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. An electronic circuit breaker comprising
controllable mechanical contacts adapted to connect and disconnect a power source to a load,
control circuitry comprising a microcontroller for monitoring the flow of power from said power source to said load and detecting different types of fault conditions and automatically opening said contacts in response to the detection of a fault condition,
a primary power supply receiving power from said power source when said contacts are closed, and supplying power to said control circuitry,
fault indicators controlled by said control circuitry for indicating the type of fault condition causing said control circuitry to open said contacts, and
a secondary power supply for supplying power to said control circuitry when said contacts are open, said secondary power supply including a switch coupled to said control circuitry for supplying power to said control circuitry from said power source when said contacts are open.

2. An electronic circuit breaker comprising
controllable mechanical contacts adapted to connect and disconnect a power source to a load,
a microcontroller for monitoring the flow of power from said power source to said load and detecting different types of fault conditions and automatically opening said contacts in response to the detection of a fault condition,
a primary power supply receiving power from said power source when said contacts are closed, and supplying power to said control circuitry, fault indicators controlled by said control circuitry for indicating the type of fault condition causing said control circuitry to open said contacts, and a secondary power supply for supplying power to said control circuitry when said contacts are open, said secondary power supply including a switch coupled to said control circuitry for supplying power to said control circuitry when said contacts are open, said switch further causing said control circuitry to test preselected parameters of the circuit breaker when said switch is closed.

3. An electronic circuit breaker comprising controllable mechanical contacts adapted to connect and disconnect a power source to a load, a microcontroller for monitoring the flow of power from said power source to said load and detecting different types of fault conditions and automatically opening said contacts in response to the detection of a fault condition, a primary power supply receiving power from said power source when said contacts are closed, and supplying power to said control circuitry, fault indicators controlled by said control circuitry for indicating the type of fault condition causing said control circuitry to open said contacts, and a secondary power supply for supplying power to said control circuitry when said contacts are open, said secondary power supply including a switch coupled to said control circuitry for supplying power to said control circuitry when said contacts are open, said switch being a manually operated switch connected to said power source on the source side of said controllable mechanical contacts, and the other side of said switch is coupled to said control circuitry;

whereby, the closing of said switch can couple said power source through the secondary power supply to said control circuitry when said controllable mechanical contacts are open.

4. The circuit breaker of claim 3 in which said power source is an AC source, and the primary power supply includes a rectifier, coupled both to said manually operated switch and to said control circuitry, for converting power from said AC power source to DC power for said control circuitry.

5. The circuit breaker of claim 3 in which said microcontroller is adapted to receive power via said controllable mechanical contacts when said contacts are closed or via said manually operated switch when said contacts are open, and said microcontroller is programmed to detect fault conditions, to open said contacts in response to the detection of a fault condition, and to automatically switch between a fault-protection mode of operation when said contacts are closed, and a type of fault-indicating mode of operation when said contacts are open.

6. The circuit breaker of claim 5 in which said microcontroller is programmed to detect a coupling of said power source to said microcontroller via said controllable mechanical contacts, and to automatically switch to said fault-indicating mode when said power source is not coupled to said microcontroller via said contacts.

7. The circuit breaker of claim 3 in which said manually operated switch is a push-to-test switch normally used for initiating automatic testing of preselected parameters of the circuit breaker when said controllable mechanical contacts are closed.

8. The circuit breaker of claim 3 in which said power source is an AC source, and said primary power supply includes a rectifier coupling said manually operated switch to said control circuitry thereby providing DC power for said control circuitry.

9. A method of powering an electronic circuit breaker that includes controllable mechanical contacts adapted to connect and disconnect a power source to at least one load, said method comprising monitoring, from control circuitry in said circuit breaker, the flow of power from said power source to said load, detecting different types of fault conditions, and automatically opening said contacts in response to the detection of a fault condition receiving power from said power source when said contacts are closed, and supplying power to said control circuitry, storing information identifying the type of fault condition causing said control circuitry to open said contacts, and supplying power to said microcontroller when said contacts are open, by manually closing a switch to connect said power source to said microcontroller to supply power to said microcontroller when said contacts are open.

10. The method of claim 9 which includes converting power from said AC power source to DC power for said control circuitry.

11. The method of claim 9 which includes automatically switching said control circuitry between a fault-protection mode of operation when said contacts are closed, and a fault-indicating mode of operation when said contacts are open.

12. The method of claim 11 which includes automatically switching to said fault-indicating mode of operation when (1) said power source is not coupled to said microcontroller via said contacts and (2) said switch is manually closed.

13. The method of claim 12 in which said switch is a push-to-test switch normally used for initiating automatic testing of preselected parameters of the circuit breaker, said push-to-test switch activating said secondary power supply.

14. The method of claim 9 in which said power source is an AC source, and including the step of converting, within the circuit breaker, AC power from said power source to DC power for operating said control circuitry.

* * * * *